United States Patent
Mooney et al.

(10) Patent No.: US 12,203,013 B2
(45) Date of Patent: Jan. 21, 2025

(54) TWO-PART, CYANOACRYLATE/CATIONICALLY CURABLE ADHESIVE SYSTEMS

(71) Applicant: Henkel AG & Co. KGaA, Duesseldorf (DE)

(72) Inventors: Aine Mooney, Dublin (IE); Susan Reilly, Clane (IE); Deborah Moore, Bray (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 584 days.

(21) Appl. No.: 17/466,001

(22) Filed: Sep. 3, 2021

(65) Prior Publication Data

US 2021/0395571 A1    Dec. 23, 2021

Related U.S. Application Data

(63) Continuation of application No. PCT/EP2020/054946, filed on Feb. 25, 2020.

(30) Foreign Application Priority Data

Mar. 4, 2019 (GB) .................................... 1902903

(51) Int. Cl.
  *C09J 133/06*  (2006.01)
  *C08F 4/14*    (2006.01)
  *C08F 20/34*   (2006.01)
  *C08K 3/36*    (2006.01)
  *C08L 63/00*   (2006.01)
  *C09J 4/06*    (2006.01)

(52) U.S. Cl.
  CPC .............. *C09J 4/06* (2013.01); *C08F 4/14* (2013.01); *C08F 20/34* (2013.01); *C08K 3/36* (2013.01); *C08L 63/00* (2013.01); *C08K 2201/006* (2013.01); *C08K 2201/011* (2013.01); *C09J 133/06* (2013.01)

(58) Field of Classification Search
  None
  See application file for complete search history.

(56) References Cited

U.S. PATENT DOCUMENTS

| | | |
|---|---|---|
| 4,102,945 A | 7/1978 | Gleave |
| 4,336,367 A | 6/1982 | Morris et al. |
| 4,419,496 A | 12/1983 | Henton et al. |
| 4,440,910 A | 4/1984 | O'Connor |
| 4,444,933 A | 4/1984 | Columbus et al. |
| 4,477,607 A | 10/1984 | Thompson et al. |
| 4,556,700 A | 12/1985 | Harris et al. |
| 4,622,414 A | 11/1986 | Mckervey |
| 4,636,539 A | 1/1987 | Harris et al. |
| 4,695,615 A | 9/1987 | Leonard et al. |
| 4,718,966 A | 1/1988 | Harris et al. |
| 4,778,851 A | 10/1988 | Henton et al. |
| 4,837,260 A | 6/1989 | Sato et al. |
| 4,855,461 A | 8/1989 | Harris et al. |
| 4,906,317 A | 3/1990 | Liu |
| 5,312,864 A | 5/1994 | Wenz et al. |
| 5,382,635 A | 1/1995 | Mcinnis et al. |
| 5,506,283 A | 4/1996 | Mcinnis et al. |
| 5,530,037 A | 6/1996 | Mcdonnell et al. |
| 5,693,714 A | 12/1997 | Bauman et al. |
| 5,969,053 A | 10/1999 | Bauman et al. |
| 5,981,659 A | 11/1999 | Geck et al. |
| 6,111,015 A | 8/2000 | Eldin et al. |
| 6,147,142 A | 11/2000 | Geck et al. |
| 6,180,693 B1 | 1/2001 | Tang et al. |
| 6,429,281 B1 | 8/2002 | Dershem et al. |
| 6,607,632 B1 | 8/2003 | Mcdonnell et al. |
| 6,617,400 B2 | 9/2003 | Yeager et al. |
| 7,777,064 B2 | 8/2010 | Mizori |
| 8,742,048 B2 | 6/2014 | Hersee et al. |
| 9,499,978 B2 | 11/2016 | Glancy |
| 2010/0305236 A1* | 12/2010 | Scholz .................. C09C 1/3081 523/402 |
| 2013/0053497 A1 | 2/2013 | Tully et al. |
| 2014/0275419 A1* | 9/2014 | Ward ......................... C09J 4/00 524/879 |

FOREIGN PATENT DOCUMENTS

| | | |
|---|---|---|
| CN | 103228747 A | 7/2013 |
| EP | 0209067 | 1/1987 |
| JP | H04173884 A | 6/1992 |
| JP | 2010528133 A | 8/2010 |
| JP | 2016515153 A | 5/2016 |
| WO | 2004/108825 | 12/2004 |
| WO | 2012035112 A1 | 3/2012 |

OTHER PUBLICATIONS

International Search Report issued in connection with International Application No. PCT/EP2020/054946 mailed Aug. 21, 2020.
"Basic characteristics of Aerosil? fumed silica Technical Bulletin Fine Particles 11", Sep. 22, 2015 (Sep. 22, 2015), pp. 1-70, XP055215228, Retrieved from the Internet: URL: https://www.aerosil.com/sites/lists/IM/Documents/TB-11-Basic-Characteristics-of-AEROSIL-Fumed-Silica-EN.pdf [retrieved on Sep. 22, 2015] Conversion from hydrophilic to hydrophobic; p. 47.

* cited by examiner

*Primary Examiner* — Richard A. Huhn
(74) *Attorney, Agent, or Firm* — Steven C. Bauman

(57) ABSTRACT

Two-part cyanoacrylate/cationically curable adhesive systems, are provided.

21 Claims, No Drawings

TWO-PART, CYANOACRYLATE/CATIONICALLY CURABLE ADHESIVE SYSTEMS

BACKGROUND

Field

Two-part cyanoacrylate/cationically curable adhesive systems are provided.

Brief Discussion of Related Technology

Curable compositions such as cyanoacrylate adhesives are well recognized for their excellent ability to rapidly bond a wide range of substrates, generally in a number of minutes and depending on the particular substrate, often in a number of seconds.

Polymerization of cyanoacrylates is initiated by nucleophiles found under normal atmospheric conditions on most surfaces. The initiation by surface chemistry means that sufficient initiating species are available when two surfaces are in close contact with a small layer of cyanoacrylate between the two surfaces. Under these conditions a strong bond is obtained in a short period of time. Thus, in essence the cyanoacrylate often functions as an instant adhesive.

Cyanoacrylate adhesive performance, particularly durability, oftentimes becomes suspect when exposed to elevated temperature conditions and/or high relative humidity conditions. To combat these application-dependent shortcomings, a host of additives have been identified for inclusion in cyanoacrylate adhesive formulations. Improvements would still be seen as beneficial.

Cationically curable compositions generally are well known, a chief example among them being epoxy compositions which are widely used. Epoxy compositions once cured are known to form robust bonds between substrates made from many different types of materials. However, epoxy compositions, whether in one part or two parts, do not have anywhere near the same rapid fixture time shown by cyanoacrylates, and may tend to show poor performance properties on substrates constructed from certain materials in particular plastic substrates, such as polycarbonate ("PC"), acrylonitrile-butadiene-styrene copolymer ("ABS"), polymethylmethacrylate ("PMMA"), and polyvinyl chloride ("PVC"), to name a few.

Conventional thixotropic additives compatible with cyanoacrylates have proven to be incompatible with the cationic catalyst used in the recently developed two-part cyanoacrylate/cationically curable adhesive systems, such as those promoted by Henkel under the LOCTITE tradename, for instance LOCTITE 4090. (See e.g. U.S. Pat. No. 8,742,048.)

This incompatibility has hampered development of thixotropic and non-sagging versions of these revolutionary adhesive systems.

It would be desirable to provide an adhesive system having both the features of an instant adhesive, such as in terms of the fast fixture times and ability to bond a wide range of substrates such as metals and plastics observed with cyanoacrylates, together with the robust bond strength seen with epoxy compositions, and which lend a thixotropic nature to the adhesive system.

SUMMARY

Here, a silica having hydrophobic groups and hydrophilic groups on a surface thereof has been shown to have excellent compatibility with the cationic catalyst present in the Part A composition, which is based on cyanoacrylate.

There is thus provided in one aspect a composition comprising a cyanoacrylate component, a silica having hydrophobic groups and hydrophilic groups on a surface thereof, and a cationic catalyst.

In another aspect, the composition described in the preceding paragraph is used in a two-part curable composition as a first part together with a second part comprising a cationically curable component, such as an epoxy component, an episulfide component, an oxetane component, and combinations thereof. When mixed together the cationic catalyst initiates cure of the cationically curable component. In addition, the cationically curable component may initiate cure of the cyanoacrylate.

The composition, which is room temperature curable, provides good performance across substrates constructed from a wide variety of materials such as polycarbonate ("PC"), acrylonitrile-butadiene-styrene copolymer ("ABS"), polymethylmethacrylate ("PMMA"), and polyvinyl chloride ("PVC"), and provide improved durability performance over conventional cyanoacrylate compositions and improved fixture time and improved plastics bonding over conventional cationically curable compositions.

DETAILED DESCRIPTION

Part A

The cyanoacrylate component includes cyanoacrylate monomers, such as those represented by $H_2C=C(CN)-COOR$, where R is selected from $C_{1-15}$ alkyl, $C_{2-15}$ alkoxyalkyl, $C_{3-15}$ cycloalkyl, $C_{2-15}$ alkenyl, $C_{7-15}$ aralkyl, $C_{6-15}$ aryl, $C_{3-15}$ allyl and $C_{3-15}$ haloalkyl groups. Desirably, the cyanoacrylate monomer is selected from methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof. A particularly desirable one is ethyl-2-cyanoacrylate ("ECA").

The cyanoacrylate component should be included in the Part A composition in an amount within the range of from about 50 percent by weight to about 99.98 percent by weight, such as about 65 percent by weight to about 85 percent by weight being desirable, and about 75 percent by weight to about 97 percent by weight of the total Part A composition being particularly desirable.

The silica having hydrophobic groups and hydrophilic groups on a surface thereof is neither strictly a hydrophobic silica filler nor a strictly hydrophilic silica filler. The balance of both hydrophobic groups and hydrophilic groups on the surface of the silica seems to be significant in permitting the Part A composition to achieve the physical properties (such as thixotropy) deemed desirable for use in the two-part, curable composition described herein.

The silica having hydrophobic groups and hydrophilic groups on a surface thereof should be included in the Part A composition in an amount within the range of from about 0.50 percent by weight to about 10 percent by weight by weight of the total Part A composition, such as about 1 percent by weight to about 7.5 percent by weight by weight of the total Part A composition being desirable, and about 2.5 to about 5 percent by weight of the total Part A composition being particularly desirable.

The silica having hydrophobic groups and hydrophilic groups on a surface thereof is commercially available, such as under the tradename AEROSIL from Evonik. A particularly desirable commercially available silica having hydrophobic groups and hydrophilic groups on a surface thereof is AEROSIL R 816. The manufacturer Evonik reports its chemical name as silane, hexadecyltrimethoxy-, hydrolysis products with silica (CAS-No. 199876-45-4), which is a fumed silica after-treated with hexadecyl silane, specifically a hexadecyltrimethoxysilane. Some of the features of this surface-treated fumed silica that are significant in the present invention include a BET surface area of 170-210 (by a test method found in ISO 9277) and a carbon content of 0.9-1.8 (by a test method found in ISO 3262-20).

As the cationic catalyst to be included in the Part A composition of the two-part adhesive system, a hard cation non-nucleophilic anion catalyst should be used. Examples of such catalysts include salts of lithium and metals from Group II of the Periodic Table, and non-nucleophilic acids. Such non-nucleophilic acids have a pH of less than 1.0 when measured as a 10% by weight solution in water and the anion portion of such acids does readily participate in displacement reactions with organic halides. Examples of the Group II metal salts include calcium and magnesium. Examples of non-nucleophilic acids include fluoroboric, fluoroarsenic, fluoroantimonic and fluorophosphoric acids. Accordingly, examples of hard cation non-nucleophilic anion salts include lithium tetrafluoroborate, calcium di-tetrafluoroborate, magnesium di-tetrafluoroborate, lithium hexafluorophosphate, calcium di-hexafluorophosphate, magnesium di-hexafluorophosphate, lithium hexafluoroantimonate and lithium hexafluoroarsenate. Suitable combinations may be used.

The cationic catalyst may also include lanthanide triflate salts, aryl iodonium salts, aryl sulfonium salts, lanthanum triflate, ytterbium triflate, trimethoxyboroxine, trimethoxyboroxine-aluminum acetyl acetonate, amine-boron trihalide complexes, quaternary ammonium salts, quaternary phosphonium salts, tri-aryl sulfonium salts, di-aryl iodonium salts, and diazonium salts. Suitable combinations may be used.

Another cationic catalyst suitable for use herein in the Part A composition is the trialkoxyboroxine class of curing agents, such as are described in U.S. Pat. Nos. 4,336,367 and 6,617,400, the disclosures of each of which are hereby incorporated herein by reference. Of course, combinations of any two or more of these cationic catalysts may be used as well.

Also suitable for use as some or all of the cationic catalyst are boron trifluoride, boron trifluoride-etherate, sulphur trioxide (and hydrolysis products thereof) and methane sulfonic acid, which are oftentimes used to stabilize cyanoacrylate monomers against anionic polymerization (see below), a known issue in shelf life stabilization. Suitable combinations may be used.

Typically, the amount of cationic catalyst will fall in the range of about 0.001 percent by weight up to about 10.00 percent by weight of the Part A composition, desirably about 0.01 percent by weight up to about 5.00 percent by weight of the Part A composition, such as about 0.50 to 2.50 percent by weight of the Part A composition.

Additives may be included in the Part A composition of the adhesive system to confer physical properties, such as improved fixture speed, improved shelf-life stability, flexibility, thixotropy, increased viscosity, color, and improved toughness. Such additives therefore may be selected from accelerators, free radical stabilizers, anionic stabilizers, gelling agents, thickeners [such as PMMAs], thixotropy conferring agents (such as fumed silica), dyes, toughening agents, plasticizers and combinations thereof.

These additives are discussed in more detail below. However, the accelerators and stabilizers are discussed here.

One or more accelerators may also be used in the adhesive system, particularly in the Part A composition, to accelerate cure of the cyanoacrylate component. Such accelerators may be selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718,966, and 4,855,461, the disclosures of each of which are hereby expressly incorporated herein by reference.

For instance, as regards calixarenes, those within the structure below are useful herein:

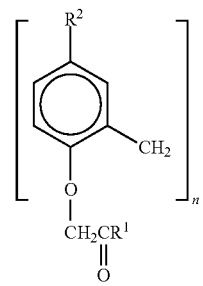

where $R^1$ is $C_{1-4}$ alkyl, alkoxy, substituted alkyl or substituted alkoxy; $R^2$ is H or $C_{1-4}$ alkyl; and n is 4, 6 or 8.

One particularly desirable calixarene is tetrabutyl tetra[2-ethoxy-2-oxoethoxy]calix-4-arene.

A host of crown ethers are known. For instance, examples, which may be used herein either individually or in combination include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-15-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated here by reference.

Of the silacrowns, again many are known, and are reported in the literature. For instance, a typical silacrown may be represented within the structure below:

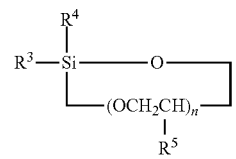

where $R^3$ and $R^4$ are organo groups which do not themselves cause polymerization of the cyanoacrylate monomer, $R^5$ is H or $CH_3$ and n is an integer of between 1 and 4. Examples of suitable $R^3$ and $R^4$ groups are R groups, alkoxy groups, such as methoxy, and aryloxy groups, such as phenoxy. The $R^3$ and $R^4$ groups may contain halogen or other substituents, an example being trifluoropropyl. However, groups not suitable as $R^4$ and $R^5$ groups are basic groups, such as amino, substituted amino and alkylamino.

Specific examples of silacrown compounds useful in the inventive compositions include:

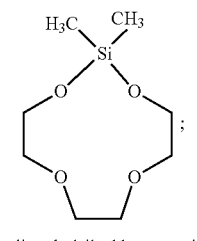
dimethylsila-11-crown-4

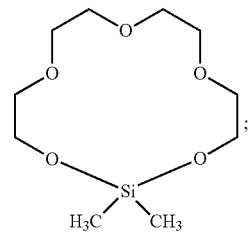
dimethylsila-14-crown-5

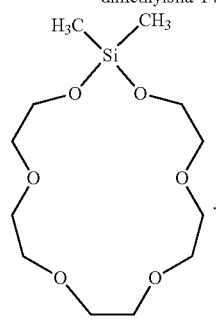
dimethylsila-17-crown-6

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as an accelerator component.

In addition, poly(ethylene glycol) di(meth)acrylates suitable for use herein include those within the structure below:

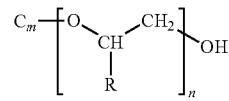

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the structure below:

$$C_m\text{--}\left[O\underset{R}{\overset{CH_2}{\underset{|}{CH}}}\right]_n OH$$

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

Commercially available examples of such materials include those offered under the DEHYDOL tradename from BASF, Dusseldorf, Germany, such as DEHYDOL 100.

In addition, accelerators embraced within the structure below:

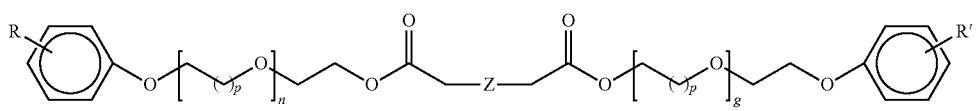

where R is hydrogen, $C_{1-6}$ alkyl, $C_{1-6}$ alkyloxy, alkyl thioethers, haloalkyl, carboxylic acid and esters thereof, sulfinic, sulfonic and sulfurous acids and esters, phosphinic, phosphonic and phosphorous acids and esters thereof, Z is a polyether linkage, n is 1-12 and p is 1-3 are as defined above, and R' is the same as R, and g is the same as n.

A particularly desirable chemical within this class as an accelerator component is

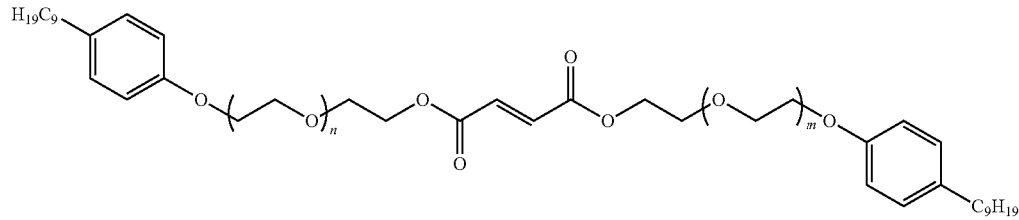

where n and m combined are greater than or equal to 12.

The accelerator should be included in the composition in an amount within the range of from about 0.01% to about 10% by weight of the total Part A composition, with the range of about 0.1 to about 0.5% by weight of the total Part A composition being desirable, and about 0.4% by weight of the total Part A composition being particularly desirable.

Stabilizers useful in the Part A composition of the adhesive system include free-radical stabilizers, anionic stabilizers and stabilizer packages that include combinations thereof. The identity and amount of such stabilizers are well known to those of ordinary skill in the art. See e.g. U.S. Pat. Nos. 5,530,037 and 6,607,632, the disclosures of each of which are hereby incorporated herein by reference. Commonly used free-radical stabilizers include hydroquinone, while commonly used anionic stabilizers include boron trifluoride, boron trifluoride-etherate, sulphur trioxide (and hydrolysis products thereof) and methane sulfonic acid. These anionic stabilizers can also serve as the cationic catalyst or a portion thereof, as noted above. Suitable combinations may be used.

Part B

Cationically curable monomers for use in the Part B composition include epoxy monomers, episulfide monomers, oxetane monomers, and combinations thereof.

Epoxy monomers for use in Part B of the composition include a host of epoxy monomers, with some of the epoxy monomers being aromatic, while others are aliphatic and still others are cycloaliphatic. Examples of such epoxy monomers include bisphenol F diglycidyl ethers (and hydrogenated versions thereof), bisphenol A diglycidyl ethers (and hydrogenated versions thereof), bisphenol S diglycidyl ethers (and hydrogenated versions thereof), bisphenol E diglycidyl ethers (and hydrogenated versions thereof), biphenyl diglycidyl ethers (and hydrogenated versions thereof), 4-vinyl-1-cyclohexene diepoxide, butanediol diglycidyl ether, neopentylglycol diglycidyl ether, 3,4-epoxycyclohexylmethyl-3,4-epoxycyclohexanecarboxylate, limonene diepoxide, hexanediol diglycidyl ether, trimethylolpropane triglycidyl ether, aniline diglycidyl ether, diglycidyl ether of propylene glycol, cyanuric acid triglycidyl ether, ortho-phthalic acid diglycidyl ether, diglycidyl ester of linoleic dimer acid, dicyclopentadiene diepoxide, tetrachlorobisphenol A glycidyl ethers, 1,1,1-tris(p-hydroxyphenyl) ethane glycidyl ether, tetra glycidyl ether of tetrakis(4-hydroxyphenyl)ethane, epoxy phenol novolac resins, epoxy cresol novolac resins, tetraglycidyl-4,4'-diaminodiphenylmethane, and the like. Suitable combinations may be used.

Among the commercially available epoxy resins suitable for use are polyglycidyl derivatives of phenolic compounds, such as those available under the tradenames EPON 828, EPON 1001, EPON 1009, and EPON 1031, from Shell Chemical Co.; DER 331, DER 332, DER 334, and DER 542 from Dow Chemical Co.; GY285 from Vantico, Tarrytown, NY; and BREN-S from Nippon Kayaku, Japan; epoxidised polybutadienes, such as those sold under the trade designation PolyBD from Sartomer, EPOLEAD PB 3600 from Daicel, JP-100 and JP-200 from Nippon Soda, epoxidised liquid isoprene rubbers such as KL-610, KL-613 and KL-630T from Kuraray; and epoxidised liquid polyisoprenes such as EPDXYPRENE 25 and EPDXYPRENE 50 from Sanyo Corporation. Other suitable epoxy resins include polyepoxides prepared from polyols and the like and polyglycidyl derivatives of phenol-formaldehyde novolacs, the latter of which are available commercially under the tradenames DEN 431, DEN 438, and DEN 439 from Dow Chemical Company. Cresol analogs are also available commercially ECN 1235, ECN 1273, and ECN 1299 from Ciba Specialty Chemicals. SU-8 is a bisphenol A-type epoxy novolac available from Resolution. Of course, cycloaliphatic epoxy resins, such as those available under the CYRACURE tradename, and hydrogenated bisphenol and biphenyl type epoxy resins, as noted, such as those available under the EPALLOY tradename, are suitable for use herein. Suitable combinations may be used.

Cycloaliphatic epoxy resins contain at least one cycloaliphatic group and at least one oxirane group, oftentimes two oxirane groups. Representative cycloaliphatic epoxy resins include 2-(3,4-epoxy)cyclohexyl-5,5-spiro-(3,4-epoxy)cyclohexane-m-dioxane, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate,
vinyl cyclohexanedioxide, bis(3,4-epoxycyclohexylmethyl) adipate, bis(3,4-epoxy-6-methylcyclohexylmethyl)adipate, exo-exo bis(2,3-epoxycyclopentyl) ether, endo-exo bis(2,3-epoxycyclopentyl) ether, 2,2-bis(4-(2,3-epoxypropoxy)cyclohexyl)propane, 2,6-bis(2,3-epoxypropoxycyclohexyl-p-dioxane), 2,6-bis(2,3-epoxypropoxy)norbornene, the diglycidylether of linoleic acid dimer, limonene dioxide, 3-vinylcyclohexene oxide, 3-vinylcyclohexene dioxide, epoxidised poly(1,3-butadiene-acrylonitrile), epoxidised soybean oil, epoxidised castor oil, epoxidised linseed oil, 2,2-bis(3,4-epoxycyclohexyl)propane, dicyclopentadiene dioxide, tricyclopentadiene dioxide, tetracyclopentadiene dioxide, 1,2-epoxy-6-(2,3-epoxypropoxy)hexahydro-4,7-methanoindane, p-(2,3-epoxy)cyclopentylphenyl-2,3-epoxypropylether, 1-(2,3-epoxypropoxy)phenyl-5,6-epoxyhexahydro-4,7-methanoindane, o-(2,3epoxy) cyclopentylphenyl-2,3-epoxypropyl ether), 1,2-bis[5-(1,2-epoxy)-4,7-hexahydromethanoindanoxyl]ethane, cyclopentenylphenyl glycidyl ether, cyclohexanediol diglycidyl ether, and diglycidyl hexahydrophthalate. Siloxane functional epoxy resins may also be utilised such as 1,3-bis (3,4-epoxycyclohexyl-2-ethyl)-1,1,3,3-tetramethyldisiloxane and other epoxy functional linear/cyclic siloxanes such as those disclosed in U.S. Pat. No. 7,777,064, the disclosure of which being hereby expressly incorporated herein by reference. In particular embodiments cycloaliphatic epoxy resins are 3,4-epoxycyclohexylmethyl-3, 4-epoxycyclohexanecarboxylate and 3,4-epox-6-methylcyclohexylmethyl-3,4-epoxy-6-methylcyclohexanecarboxylate. Other examples of cycloaliphatic epoxies suitable for use herein include those disclosed and described in U.S. Pat. No. 6,429,281 (Dershem), the disclosure of which being hereby expressly incorporated herein by reference.

And of course combinations of the epoxy resins are also desirable for use herein.

The episulfide monomer may simply be the full or partial sulphur-containing three-membered ring version of the base epoxy monomer.

The oxetane monomers may be chosen from

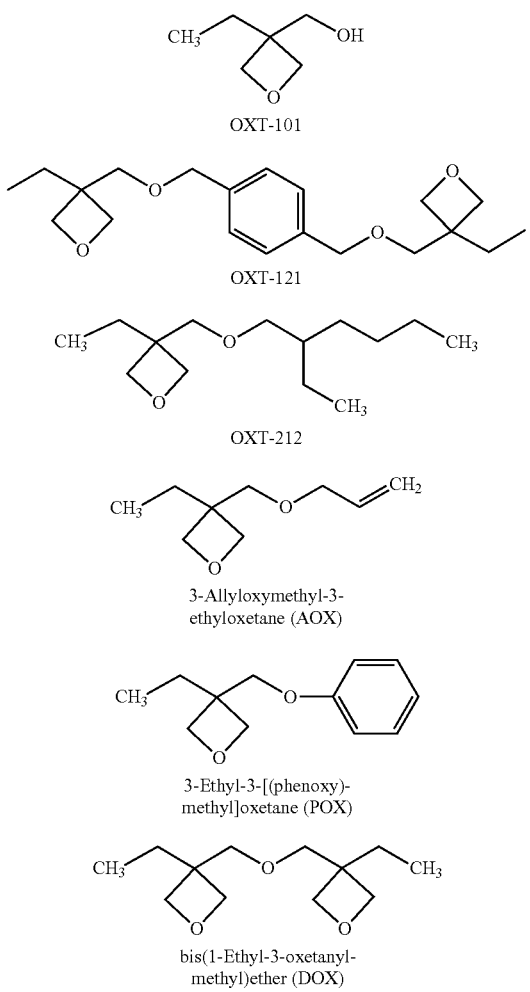

A  OXT-101

B  OXT-121

C  OXT-212

D  3-Allyloxymethyl-3-ethyloxetane (AOX)

E  3-Ethyl-3-[(phenoxy)-methyl]oxetane (POX)

F  bis(1-Ethyl-3-oxetanyl-methyl)ether (DOX)

Oxetanes labeled A-C are available from Toa Gosei Co., Ltd., Japan. Suitable combinations may also be used.

The vinyl ether monomer may be selected from a host of materials, such as those commercially available under the tradename VEctomer from Vertellus Performance Materials Inc., Greensboro, N.C. Examples include VEctomer vinyl ether 4010 [Bis-(4-vinyl oxy butyl) isophthalate], VEctomer vinyl ether 4060 [Bis(4-vinyl oxy butyl) adipate], and VEctomer vinyl ether 5015 [Tris(4-vinyloxybutyl)trimellitate].

The epoxy, episulfide, oxetane and/or vinyl ether monomer may be one that is functionalized with one or more alkoxy silane groups. Examples of such materials include those commercially available from Gelest Inc., Morrisville, PA.

As discussed above, additives may be included in either or both of the Part A or the Part B compositions to influence a variety of performance properties.

Fillers contemplated for optional use include, for example, aluminum nitride, boron nitride, silicon carbide, diamond, graphite, beryllium oxide, magnesia, silicas other than those having hydrophobic groups and hydrophilic groups on a surface thereof, such as fumed silica or fused silica, alumina, perfluorinated hydrocarbon polymers (i.e., TEFLON), thermoplastic polymers, thermoplastic elastomers, mica, glass powder and the like. Preferably, the particle size of these fillers will be about 20 microns or less.

As regards those other silicas, the silica may have a mean particle diameter on the nanoparticle size; that is, having a mean particle diameter on the order of 10-9 meters. The silica nanoparticles can be pre-dispersed in epoxy resins, and may be selected from those available under the tradename NANOPDX, from Nanoresins, Germany. NANOPDX is a tradename for a product family of silica nanoparticle reinforced epoxy resins showing an outstanding combination of material properties. The silica phase consists of surface-modified, synthetic $SiO_2$ nanospheres with less than 50 nm diameter and an extremely narrow particle size distribution. The $SiO_2$ nanospheres are agglomerate-free dispersions in the epoxy resin matrix resulting in a low viscosity for resins containing up to 50 percent by weight silica.

A commercially available example of the NANOPDX products particularly desirable for use herein includes NANOPDX A610 (a 40 percent by weight dispersion in a cycloaliphatic epoxy resin matrix). The NANOPDX products are believed to have a particle size of about 5 nm to about 80 nm, though the manufacturer reports less than 50 nm.

The silica component should be present in an amount in the range of about 1 to about 60 percent by weight, such as about 3 to about 30 percent by weight, desirably about 5 to about 20 percent by weight, based on the total weight of the composition.

Flexibilizers (also called plasticizers) contemplated for use include branched polyalkanes or polysiloxanes that can lower the $T_g$ of the composition. Such flexibilizers include, for example, polyethers, polyesters, polythiols, polysulfides, and the like. If used, flexibilizers typically are present in the range of about 0.5 percent by weight up to about 30 percent by weight of the total Part B composition.

The flexibilizers may also be reactive; that is, they may be functionalized so as to react into the cured reaction product. In such cases, hydroxyl-functionalized resins can be used, as they tend to co-react with cationically curable components, such as epoxy resins, and thus used can modify the mechanical properties of the cured products.

For instance, hydroxy-functionalized aliphatic polyester diols provide improved flexibility to the cured composition. One commercially available example of the diol is available under the tradename K-FLEX A307, which is from King Industries. K-FLEX A307 is reported by the manufacturer to be a low viscosity, 100% solids linear, saturated, aliphatic polyester diol with primary hydroxyl groups. K-FLEX A307 is promoted to have been designed as a flexibility modifier for acrylic/isocyanates and acrylic/melamine systems. Commercial applications are advertised as automotive OEM, automotive refinish, aerospace, industrial maintenance, and plastic coatings.

Others include PolyTHF 650/1400/2000/2900 (sold under the trade name TERATHANE), polycaprolactone diols and triols (Aldrich), polydimethylsiloxane-polycaprolactone diols (such as WAX 350 OH D from Wacker), K-PURE CDR-3441, CDR-3319 (King Industry) and primary or secondary hydroxyl terminated polybutadienes/hydrogenated polybutadienes (Cray Valley, such as PolyBd/Krasol materials).

Tougheners contemplated for use particularly in the Part A composition include elastomeric polymers selected from elastomeric copolymers of a lower alkene monomer and (i) acrylic acid esters, (ii) methacrylic acid esters or (iii) vinyl acetate, such as acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful. [See U.S. Pat. No. 4,440,910 (O'Connor), the disclosures of each of which are hereby expressly incorporated herein by reference.] The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides. Suitable combinations may be used.

For instance, one group of such elastomeric polymers are copolymers of methyl acrylate and ethylene, manufactured by DuPont, under the name of VAMAC, such as VAMAC N123 and VAMAC B-124. VAMAC N123 and VAMAC B-124 are reported by DuPont to be a master batch of ethylene/acrylic elastomer. The DuPont material VAMAC G is a similar copolymer, but contains no fillers to provide color or stabilizers. VAMAC VCS rubber appears to be the base rubber, from which the remaining members of the VAMAC product line are compounded. VAMAC VCS (also known as VAMAC MR) is a reaction product of the combination of ethylene, methyl acrylate and monomers having carboxylic acid cure sites, which once formed is then substantially free of processing aids such as the release agents octadecyl amine, complex organic phosphate esters and/or stearic acid, and anti-oxidants, such as substituted diphenyl amine. Suitable combinations may be used.

Recently, DuPont has provided to the market under the trade designation VAMAC VMX 1012 and VCD 6200, which are rubbers made from ethylene and methyl acrylate. It is believed that the VAMAC VMX 1012 rubber possesses little to no carboxylic acid in the polymer backbone. Like the VAMAC VCS rubber, the VAMAC VMX 1012 and VCD 6200 rubbers are substantially free of processing aids such as the release agents octadecyl amine, complex organic phosphate esters and/or stearic acid, and anti-oxidants, such as substituted diphenyl amine, noted above. All of these VAMAC elastomeric polymers are useful herein.

In addition, vinylidene chloride-acrylonitrile copolymers [see U.S. Pat. No. 4,102,945 (Gleave)] and vinyl chloride/vinyl acetate copolymers [see U.S. Pat. No. 4,444,933 (Columbus)] may be included in the Part A composition. Of course, the disclosures of each these U.S. patents are hereby incorporated herein by reference in their entirety.

Copolymers of polyethylene and polyvinyl acetate, available commercially under the tradename LEVAMELT by LANXESS Limited, are useful.

A range of LEVAMELT agents is available and includes for example, LEVAMELT 400, LEVAMELT 600 and LEVAMELT 900. The LEVAMELT products differ in the amount of vinyl acetate present. For example, LEVAMELT 400 comprises an ethylene-vinyl acetate copolymer comprising 40 percent by weight vinyl acetate. The LEVAMELT-brand products are supplied in granular form. The granules are almost colourless and dusted with silica and talc. The LEVAMELT-brand products consist of methylene units forming a saturated main chain with pendant acetate groups. The presence of a fully saturated main chain is an indication that LEVAMELT is a particularly stable polymer. It does not contain any reactive double bonds which make conventional rubbers prone to aging reactions, ozone and UV light. The saturated backbone is reported to make it robust.

Interestingly, depending on the ratio of polyethylene/polyvinylacetate, the solubilities of these LEVAMELT elastomers change in different monomers and also the ability to toughen changes as a result of the solubility.

The LEVAMELT elastomers are available in pellet form and are easier to formulate than other known elastomeric toughening agents.

VINNOL brand surface coating resins available commercially from Wacker Chemie AG, Munich, Germany represent a broad range of vinyl chloride-derived copolymers and terpolymers that are promoted for use in different industrial applications. The main constituents of these polymers are different compositions of vinyl chloride and vinyl acetate. The terpolymers of the VINNOL product line additionally contain carboxyl or hydroxyl groups. These vinyl chloride/vinyl acetate copolymers and terpolymers may also be used.

VINNOL surface coating resins with carboxyl groups are terpolymers of vinyl chloride, vinyl acetate and dicarboxylic acids, varying in terms of their molar composition and degree and process of polymerization. These terpolymers are reported to show excellent adhesion, particularly on metallic substrates.

VINNOL surface coating resins with hydroxyl groups are copolymers and terpolymers of vinyl chloride, hydroxyacrylate and dicarboxylate, varying in terms of their composition and degree of polymerization.

VINNOL surface coating resins without functional groups are copolymers of vinyl chloride and vinyl acetate of variable molar composition and degree of polymerization.

Rubber particles, especially rubber particles that have relatively small average particle size (e.g., less than about 500 nm or less than about 200 nm), may also be included, particularly in the Part B composition. The rubber particles may or may not have a shell common to known core-shell structures.

In the case of rubber particles having a core-shell structure, such particles generally have a core comprised of a polymeric material having elastomeric or rubbery properties (i.e., a glass transition temperature less than about 0° C., e.g., less than about −30° C.) surrounded by a shell comprised of a non-elastomeric polymeric material (i.e., a thermoplastic or thermoset/crosslinked polymer having a glass transition temperature greater than ambient temperatures, e.g., greater than about 50° C.). For example, the core may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)

acrylonitrile, (meth)acrylates, or the like) while the shell may be comprised of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth)acrylamides, and the like having a suitably high glass transition temperature. Other rubbery polymers may also be suitably be used for the core, including polybutylacrylate or polysiloxane elastomer (e.g., polydimethylsiloxane, particularly crosslinked polydimethylsiloxane).

The rubber particle may be comprised of more than two layers (e.g., a central core of one rubbery material may be surrounded by a second core of a different rubbery material or the rubbery core may be surrounded by two shells of different composition or the rubber particle may have the structure soft core, hard shell, soft shell, hard shell). In one embodiment of the invention, the rubber particles used are comprised of a core and at least two concentric shells having different chemical compositions and/or properties. Either the core or the shell or both the core and the shell may be crosslinked (e.g., ionically or covalently). The shell may be grafted onto the core. The polymer comprising the shell may bear one or more different types of functional groups (e.g., epoxy groups) that are capable of interacting with other components of the compositions of the present invention.

Typically, the core will comprise from about 50 percent by weight to about 95 percent by weight of the rubber particles while the shell will comprise from about 5 percent by weight to about 50 percent by weight of the rubber particles.

Preferably, the rubber particles are relatively small in size. For example, the average particle size may be from about 0.03 microns to about 2 microns or from about 0.05 microns to about 1 micron. The rubber particles may have an average diameter of less than about 500 nm, such as less than about 200 nm. For example, the core-shell rubber particles may have an average diameter within the range of from about 25 nm to about 200 nm.

Methods of preparing rubber particles having a core-shell structure are well-known in the art and are described, for example, in U.S. Pat. Nos. 4,419,496, 4,778,851, 5,981,659, 6,111,015, 6,147,142 and 6,180,693, each of which being incorporated herein by reference in its entirety.

Rubber particles having a core-shell structure may be prepared as a masterbatch where the rubber particles are dispersed in one or more epoxy resins such as a diglycidyl ether of bisphenol A. For example, the rubber particles typically are prepared as aqueous dispersions or emulsions. Such dispersions or emulsions may be combined with the desired epoxy resin or mixture of epoxy resins and the water and other volatile substances removed by distillation or the like. One method of preparing such masterbatches is described in more detail in International Patent Publication No. WO 2004/108825, the disclosure of which being expressly incorporated herein by reference in its entirety. For example, an aqueous latex of rubber particles may be brought into contact with an organic medium having partial solubility in water and then with another organic medium having lower partial solubility in water than the first organic medium to separate the water and to provide a dispersion of the rubber particles in the second organic medium. This dispersion may then be mixed with the desired epoxy resin(s) and volatile substances removed by distillation or the like to provide the masterbatch.

Particularly suitable dispersions of rubber particles having a core-shell structure in an epoxy resin matrix are available from Kaneka Corporation.

For instance, the core may be formed predominantly from feed stocks of polybutadiene, polyacrylate, polybutadiene/acrylonitrile mixture, polyols and/or polysiloxanes or any other monomers that give a low glass transition temperature. The outer shells may be formed predominantly from feed stocks of polymethylmethacrylate, polystyrene or polyvinyl chloride or any other monomers that give a higher glass transition temperature.

The core shell rubbers may have a particle size in the range of 0.07 microns to 10 microns, such as 0.1 microns to 5 microns.

The core shell rubber made in this way may be dispersed in a thermosetting resin matrix, such as an epoxy matrix or a phenolic matrix. Examples of epoxy matrices include the diglycidyl ethers of bisphenol A, F or S, or biphenol, novolac epoxies, and cycloaliphatic epoxies. Examples of phenolic resins include bisphenol-A based phenoxies. The matrix material ordinarily is liquid at room temperature.

The core shell rubber dispersion may be present in an amount in the range of about 5 percent by weight to about 50 percent by weight, with about 15 percent by weight to about 25 percent by weight being desirable based on viscosity considerations. These amounts are based on the total Part B composition.

When used, these core shell rubbers allow for toughening to occur in the composition and oftentimes in a predictable manner—in terms of temperature neutrality toward cure—because of the substantial uniform dispersion, which is ordinarily observed in the core shell rubbers as they are offered for sale commercially.

Many of the core-shell rubber structures available from Kaneka, such as those available under the KANEACE tradename, are believed to have a core made from a copolymer of (meth)acrylate-butadiene-styrene, where the butadiene is the primary component in the phase separated particles, dispersed in epoxy resins. Other commercially available masterbatches of core-shell rubber particles dispersed in epoxy resins include GENIOPERL M23A (a dispersion of 30 percent by weight core-shell particles in an aromatic epoxy resin based on bisphenol A diglycidyl ether; the core-shell particles have an average diameter of ca. 100 nm and contain a crosslinked silicone elastomer core onto which an epoxy-functional acrylate copolymer has been grafted); the silicone elastomer core represents about 65 percent by weight of the core-shell particle), available from Wacker Chemie GmbH.

In the case of those rubber particles that do not have such a shell, the rubber particles may be based on the core of such structures.

Preferably, the rubber particles are relatively small in size. For example, the average particle size may be from about 0.03 microns to about 2 microns or from about 0.05 microns to about 1 microns. In certain embodiments of the invention, the rubber particles have an average diameter of less than about 500 nm. In other embodiments, the average particle size is less than about 200 nm. For example, the rubber particles may have an average diameter within the range of from about 25 nm to about 200 nm or from about 50 nm to about 150 nm.

The rubber particles generally are comprised of a polymeric material having elastomeric or rubbery properties (i.e., a glass transition temperature less than about 0° C., e.g., less than about −30° C.). For example, the rubber particles may be comprised of a diene homopolymer or copolymer (for example, a homopolymer of butadiene or isoprene, a copolymer of butadiene or isoprene with one or more ethylenically unsaturated monomers such as vinyl aromatic monomers, (meth)acrylonitrile, (meth)acrylates, or the like) and polysiloxanes. The rubber particles may contain functional groups such as carboxylate groups, hydroxyl groups or the like and may have a linear, branched, crosslinked, random copolymer or block copolymer structure.

For instance, the rubber particles may be formed predominantly from feed stocks of dienes such as butadiene, (meth)acrylates, ethylenically unsaturated nitriles such as acrylonitrile, and/or any other monomers that when polymerized or copolymerized yield a polymer or copolymer having a low glass transition temperature.

The rubber particles may be used in a dry form or may be dispersed in a matrix, as noted above.

Typically, the composition may contain rubber particles in an amount from about 5 to about 35 percent by weight.

Combinations of different rubber particles may advantageously be used in the present invention. The rubber particles may differ, for example, in particle size, the glass transition temperatures of their respective materials, whether, to what extent and by what the materials are functionalized, and whether and how their surfaces are treated.

A portion of the rubber particles may be supplied in the form of a masterbatch where the particles are stably dispersed in an epoxy resin matrix and another portion may be supplied to the adhesive composition in the form of a dry powder (i.e., without any epoxy resin or other matrix material). For example, the adhesive composition may be prepared using both a first type of rubber particles in dry powder form having an average particle diameter of from about 0.1 microns to about 0.5 microns and a second type of rubber particles stably dispersed in a matrix of liquid bisphenol A diglycidyl ether at a concentration of from about 5 percent by weight to about 50 percent by weight having an average particle diameter of from about 25 nm to about 200 nm. The weight ratio of first type:second type rubber particles may be from about 1.5:1 to about 0.3:1, for example.

The chemical composition of the rubber particles may be essentially uniform throughout each particle. However, the outer surface of the particle may be modified by reaction with a coupling agent, oxidizing agent or the like so as to enhance the ability to disperse the rubber particles in the adhesive composition (e.g., reduce agglomeration of the rubber particles, reduce the tendency of the rubber particles to settle out of the adhesive composition). Modification of the rubber particle surface may also enhance the adhesion of the epoxy resin matrix to the rubber particles when the adhesive is cured. The rubber particles may alternatively be irradiated so as to change the extent of crosslinking of the polymer(s) constituting the rubber particles in different regions of the particle. For example, the rubber particles may be treated with gamma radiation such that the rubber is more highly crosslinked near the surface of the particle than in the center of the particle.

Rubber particles that are suitable for use in the present invention are available from commercial sources. For example, rubber particles supplied by Eliokem, Inc. may be used, such as those available under the tradenames NEP R0401 and NEP R401S (both based on acrylonitrile/butadiene copolymer); NEP R0501 (based on carboxylated acrylonitrile/butadiene copolymer; CAS No. 9010-81-5); NEP R0601A (based on hydroxy-terminated polydimethylsiloxane; CAS No. 70131-67-8); and NEP R0701 and NEP 0701S (based on butadiene/styrene/2-vinylpyridine copolymer; CAS No. 25053-48-9). Also those available under the PARALOID tradename, such as PARALOID 2314, PARALOID 2300, and PARALOID 2600, from Dow Chemical Co., Philadelphia, PA, and those available under the STAPHYLOID tradename, such as STAPHYLOID AC-3832, from Ganz Chemical Co., Ltd., Osaka, Japan.

Rubber particles that have been treated with a reactive gas or other reagent to modify the outer surfaces of the particles by, for instance, creating polar groups (e.g., hydroxyl groups, carboxylic acid groups) on the particle surface, are also suitable for use in the present invention. Illustrative reactive gases include, for example, ozone, $Cl_2$, $F_2$, $O_2$, $SO_3$, and oxidative gases. Methods of surface modifying rubber particles using such reagents are known in the art and are described, for example, in U.S. Pat. Nos. 5,382,635; 5,506,283; 5,693,714; and 5,969,053, each of which is incorporated herein by reference in its entirety. Suitable surface modified rubber particles are also available from commercial sources, such as the rubbers sold under the tradename VISTAMER by Exousia Corporation.

Where the rubber particles are initially provided in dry form, it may be advantageous to ensure that such particles are well dispersed in the adhesive composition prior to curing the adhesive composition. That is, agglomerates of the rubber particles are preferably broken up so as to provide discrete individual rubber particles, which may be accomplished by intimate and thorough mixing of the dry rubber particles with other components of the adhesive composition. For example, dry rubber particles may be blended with epoxy resin and milled or melt compounded for a length of time effective to essentially completely disperse the rubber particles and break up any agglomerations of the rubber particles.

In addition, Nanoresins offers commercially products under the tradenames ALBIDUR (epoxy resins containing core shell silicone rubber particles; such as EP 2240, EP2240A, EP 5340); ALBIFLEX (epoxy-siloxane block copolymer resins); and ALBIPOX (epoxy resins containing epoxy-nitrile butadiene rubber adducts). Suitable combinations may be used.

Thickeners are also useful.

Other additives may also be included in the Part A composition. For instance, phosphoric acid may be included in the Part A composition. When included at levels in the range of about 50 ppm to about 1,000 ppm, such as about 100 to about 500 ppm, and applied to at least one aluminum substrate to be joined in a bonded assembly, improved strength and strength retention may be observed. More specifically, humidity, heat aging and solvent immersion testing show that the addition of phosphoric acid to the inventive two-part cyanoacrylate/cationically curable adhesive systems, may lead to dramatic improvements adhesive with excellent properties on both metals and plastics, particularly on aluminum durability.

In practice, each of the Part A and the Part B compositions are housed in separate containment vessels in a device prior to use, where in use the two parts are expressed from the vessels mixed and applied onto a substrate surface. The vessels may be chambers of a dual chambered cartridge, where the separate parts are advanced through the chambers with plungers through an orifice (which may be a common one or adjacent ones) and then through a mixing dispense nozzle. Or the vessels may be coaxial or side-by-side pouches, which may be cut or torn and the contents thereof mixed and applied onto a substrate surface.

The invention will be more readily appreciated by a review of the examples, which follow.

EXAMPLES

Reference to CA or cyanoacrylate in the Examples refers to ethyl-2-cyanoacrylate, unless otherwise noted.

With reference to Table 1, stock solution 1 was prepared as a base Part A composition from the listed components in the noted amounts as follows:

TABLE 1

| Component | Amt (wt %) |
|---|---|
| Ethyl cyanoacrylate | 99.7315 |
| MSA[1] | 0.0085 |
| Hydroquinone | 0.04 |
| MMBP[@] | 0.22 |

[1]Methane sulphonic acid
[@]2,2'-methylenebis(6-tert-butyl-4-methylphenol)

To stock solution 1 was added a cationic catalyst ($LiBF_4$) and fumed silica as a silica component (CAB-O-SIL TS 720) in the amounts noted to prepare Samples A-E, which are captured in Table 2.

TABLE 2

| Components | Sample/Amt (wt %) | | | | |
|---|---|---|---|---|---|
| | A | B | C | D | E |
| Stock solution 1 | 97.02 | 97.5 | 99.02 | 99.5 | 98 |
| $LiBF_4$ | 0.98 | 0.5 | 0.98 | 0.5 | 0 |
| CAB-O-SIL TS 720 | 2 | 2 | 0 | 0 | 2 |

Accelerated ageing was conducted on Samples A-E after each was placed into 20 gram bottles and aged for a period of time of 3 days at a temperature of 82° C.

The appearance and viscosity for each sample was recorded before and after ageing, and is captured in Table 3. Stock solution 1 was used for comparative purposes.

TABLE 3

| Physical Properties | Stock solution 1 | Sample | | | | |
|---|---|---|---|---|---|---|
| | | A | B | C | D | E |
| Initial Appearance | Clear and light yellow tint | Clear and light yellow tint | Clear and light yellow tint | Clear and light yellow tint | Clear and light yellow tint | Clear and light yellow tint |
| Post 3 day at 82° C. Appearance | Clear and light yellow tint | Clear and dark yellow | Clear and light yellow | Clear and dark yellow | Clear and light yellow | Clear and light yellow tint |
| Initial Viscosity (mPa·s) | 2.73 | 7.26 | 6.87 | 2.84 | 2.78 | 5.80 |
| Post 3 day at 82° C. Viscosity (mPa·s) | 2.97 | Gelled solid | Gelled solid | 7.69 | 4.0 | 6.45 |
| Viscosity Ratio* | 1.09 | — | — | 2.71 | 1.44 | 1.11 |

*The viscosity ratio is determined using a Physica MCR-100 at 25° C., with a CP-50 cone and a shear rate of 3000 $s^{-1}$, and dividing the initial viscosity by the post-conditioning viscosity.

A viscosity ratio of less than 3 is acceptable.

With reference to Table 4, stock solution 2 was prepared as a base Part A composition from the listed components in the amounts noted in Table 4 as follows, where $LiBF_4$ was added as a cationic catalyst.

TABLE 4

| Component | Amt (wt %) |
|---|---|
| Ethyl cyanoacrylate | 98.7515 |
| MSA | 0.0085 |
| Hydroquinone | 0.04 |
| MMBP | 0.22 |
| $LiBF_4$ | 0.98 |

To stock solution 2 was added various silica fillers to determine compatibility with the cationic catalyst in the cyanoacrylate. Table 5 shows the constituents of Samples F-I.

TABLE 5

| Component | | Sample/Amt (wt %) | | | |
|---|---|---|---|---|---|
| Type/Identity | | F | G | H | I |
| Cyanoacrylate | Stock solution 2 | 95 | 95 | 95 | 95 |
| Silica | CAB-O-SIL EH 5 | 5 | 0 | 0 | 0 |
| | AEROSIL 200 | 0 | 5 | 0 | 0 |
| | CAB-O-SIL TS 530 | 0 | 0 | 5 | 0 |
| | AEROSIL R 972 | 0 | 0 | 0 | 5 |

Accelerated ageing was carried out on Samples F-I after each was placed into 20 gram bottles and aged for a period of time of 3 days at a temperature of 82° C.

The appearance and viscosity for each sample was recorded before and after ageing, and are captured in Table 6. Stock solution 2 was used for comparative purposes.

TABLE 6

| Physical Properties | Stock solution 2 | Sample | | | |
|---|---|---|---|---|---|
| | | F | G | H | I |
| Initial Appearance | Clear and light yellow | Clear and light yellow | Clear and light yellow | Clear and light yellow | Clear and light yellow |
| Post 3 day at 82° C. Appearance | Clear and light yellow | Brown | Brown | Clear and yellow | Brown |
| Initial Viscosity | 3.19 | Not tested | Not tested | 12.4 | Not tested |
| Post 3 day at 82° C. Viscosity | 4.72 | Gelled Solid | Gelled Solid | 101 | Gelled Solid |
| Viscosity Ratio | 1.48 | — | — | 8.15 | — |

Of the four fumed silicas evaluated here, CAB-O-SIL TS 530 was the only one that did not cause gelation after 3 days at a temperature of 82° C. when used in combination with $LiBF_4$ in an ethyl cyanoacrylate.

CAB-O-SIL TS 530 does not however produce a high thixotropic effect (as can be seen by the viscosity ratio).

Thus, a considerable quantity—between about 5 percent by weight up to as high as about 15 percent by weight—is used to achieve a gel.

Now, using LOCTITE 454 as the base, formulations were prepared with each of AEROSIL R 816, CAB-O-SIL TS 720 and AEROSIL R 805 as a silica component, each at 6 percent by weight, with and without a cationic catalyst. Of these, only the combination of AEROSIL R 816, a cationic catalyst, and ethyl cyanoacrylate achieved a gel formulation that demonstrates anti-sag properties.

Indeed, the combination of AEROSIL R 816, cationic catalyst and cyanoacrylate produces a Part A composition with excellent stability and thixotropic properties.

Using the Part A of LOCTITE 4090 as the base, a formulation with AEROSIL R 816 was prepared and evaluated alongside a formulation prepared with AEROSIL R 805 for comparison purposes. AEROSIL R 816 is reported by the manufacturer Evonik to have a BET surface area of 170-210 (based on ISO 9277) and a carbon content of 0.9-1.8 (based on ISO 3262-20). It is a fumed silica after-treated with a hexadecyl silane. AEROSIL R 805 is reported by the manufacturer Evonik to have a BET surface area of 125-175 (based on ISO 9277) and a carbon content of 4.5-6.5 (based on ISO-3262-20). It is a fumed silica after-treated with organosiloxane.

The formulation with AEROSIL R 816 demonstrated excellent compatibility with the cationic catalyst after accelerated ageing.

This formulation was then evaluated for performance in a 1:1 mix ratio with a Part B composition, against LOCTITE 4090 and was found to produce an adhesive with similar properties.

International Patent Publication No. WO 85/01055 indicated that AEROSIL R 805 can be added to cyanoacrylate to give a non-flowable gel.

Accordingly, a sample was prepared using AEROSIL R 805 to which additional constituents were added, including a cationic catalyst. Table 7 shows the constituents of Sample J as follows.

TABLE 7

| Component | Sample J/Amt (wt %) |
|---|---|
| Ethyl cyanoacrylate | 74.813 |
| MSA | 0.0085 |
| Hydroquinone | 0.04 |
| BHA# | 0.09 |
| Phosphoric Acid | 0.054 |
| LiBF$_4$ | 0.98 |
| VINNOL | 8 |
| AEROSIL R 805 | 6 |
| SO$_2$ | 0.045 |

Butyl hydroxy anisole

Sample J was used as a Part A composition and placed into a 50 gram 1:1 dual cartridge and aged for 1, 2 and 3 day periods of time at a temperature of 82° C. (No Part B composition was placed into the other chamber of the cartridge.)

Viscosity measurements were conducted using the Physica MCR-100 (25° C., CP-50 cone) as above, and are captured in Table 8.

TABLE 8

| Physical Properties/Time (days) | Viscosity @ 20 s$^{-1}$ (mPa·s) | Casson Viscosity (mPa·s) | Casson Viscosity Ratio | Yield Point (Pa) |
|---|---|---|---|---|
| Initial | 5650 | 640.56 | — | 41.829 |
| Post 1 day @ 82° C. | 8910 | 825.75 | 1.3 | 62.107 |
| Post 2 day @ 82° C. | 17600 | 2909.3 | 4.5 | 92.932 |
| Post 3 day @ 82° C. | 38900 | 6442.7 | 10 | 82.206 |

Sample J shows good anti-sag properties and offers improved stability and compatibility over samples made with AEROSIL 200 and AEROSIL R 973, which samples gelled after aging for a period of time of 3 days at a temperature of 82° C.

Samples were prepared using a cationic catalyst with either AEROSIL R 805 or AEROSIL R 816. Table 9 shows the constituents of Samples K and L as follows:

TABLE 9

| Component | Sample/Amt (wt %) K | L |
|---|---|---|
| Ethyl cyanoacrylate | 87.482 | 87.482 |
| MSA | 0.002 | 0.002 |
| Hydroquinone | 0.05 | 0.05 |
| MMBP | 0.4 | 0.4 |
| Phosphoric Acid | 0.054 | 0.054 |
| LiBF$_4$ | 0.98 | 0.98 |
| VINNOL | 7 | 7 |
| Monarch 280 | 0.03 | 0.03 |
| AEROSIL R 805 | 4 | 0 |
| AEROSIL R 816 | 0 | 4 |
| SO$_2$ | 0.002 | 0.002 |

Each sample was placed into a 3 gram aluminum tube and aged for a period of time of 3 days at a temperature of 82° C.

Viscosity measurements were carried out initially and after ageing using the Physica MCR-100 (25° C., CP-50 cone) as above. Tables 10 and 11 capture the respective appearances and viscosity measurements that were observed.

TABLE 10

| Physical Properties/Time (days) | Sample K | | | | |
|---|---|---|---|---|---|
| | Appearance | Viscosity @ 20 s$^{-1}$ (mPa·s) | Casson Viscosity (mPa·s) | Casson Viscosity Ratio | Yield Point (Pa) |
| Initial | Black gel | 1160 | 207.46 | | 6.508 |
| Post 3 day @ 82° C. | Black gel | 10700 | 2232 | 10.8 | 18.603 |

TABLE 11

| Physical Properties/Time (days) | Sample L | | | | |
|---|---|---|---|---|---|
| | Appearance | Viscosity @ 20 s$^{-1}$ (mPa·s) | Casson Viscosity (mPa·s) | Casson Viscosity Ratio | Yield Point (Pa) |
| Initial | Black gel | 1970 | 111.97 | | 16.741 |
| Post 3 day @ 82° C. | Black gel | 6680 | 123.91 | 1.11 | 31.102 |

For comparison, LOCTITE 454 was used (only the Part A) and aged at a temperature of 35° C. in 3 gram aluminum tubes. The results are shown in Table 12 below:

TABLE 12

| Physical Properties/ Time (days) | Viscosity @ 20 s$^{-1}$ (mPa · s) | Casson Viscosity (mPa · s) | Casson Viscosity Ratio | Yield Point (Pa) |
|---|---|---|---|---|
| Initial | 8100 | 380 | — | 63.98 |
| 3 weeks @ 35° C. | 10300 | 493.72 | 1.3 | 76.31 |
| 6 weeks @ 35° C. | 10900 | 570.46 | 1.5 | 72.23 |
| 9 weeks @ 35° C. | 12800 | 868.46 | 2.3 | 75.16 |
| 12 weeks @ 35° C. | 16000 | 1452.9 | 3.8 | 78.915 |

Accelerated ageing of Sample L as the Part A composition was conducted at a temperature of 35° C. in 3 gram aluminum tubes.

Viscosity measurements were carried out using the Physica MCR-100 (25° C., CP-50 cone), as above. The results are captured below in Table 13.

TABLE 13

| Physical Properties/ Time (days) | Viscosity @ 20 s$^{-1}$ (mPa · s) | Casson Viscosity (mPa · s) | Casson Viscosity Ratio | Yield Point (Pa) |
|---|---|---|---|---|
| Initial | 2440 | 138.45 | — | 23.82 |
| 3 weeks @ 35° C. | 3140 | 204.56 | 1.5 | 14.63 |
| 6 weeks @ 35° C. | 4600 | 291.29 | 2.1 | 12.43 |
| 9 weeks @ 35° C. | 5850 | 405.72 | 2.9 | 9.23 |
| 12 weeks @ 35° C. | 5330 | 491.85 | 3.6 | 6.39 |

These results show that Sample L (formulation containing ethyl cyanoacrylate, cationic catalyst and AEROSIL R 816) has acceptable stability, with viscosity ratios over the accelerated ageing study in line with those measured for LOCTITE 454.

What is claimed is:

1. A two-part curable composition comprising:
   (a) a first part comprising a cyanoacrylate component, a silica having hydrophobic groups that comprise organosilane groups and hydrophilic groups on a surface thereof that comprise silanol groups, and a cationic catalyst; and
   (b) a second part comprising a cationic curable component, wherein when mixed together the cationic catalyst initiates cure of the cationic curable component.

2. The composition of claim 1, wherein the cyanoacrylate component comprises H$_2$C═C(CN)—COOR, wherein R is selected from alkyl, alkoxyalkyl, cycloalkyl, alkenyl, aralkyl, aryl, allyl and haloalkyl groups.

3. The composition of claim 1, wherein the cationic catalyst comprises salts of lithium and metals from Group II of the Periodic Table, and non-nucleophilic acids.

4. The composition of claim 1, wherein the cationic catalyst is a non-nucleophilic acid having a pH of less than 1.0 when measured as a 10% by weight solution in water.

5. The composition of claim 1, wherein the cationic catalyst is a member selected from the group consisting of fluoroboric, fluoroarsenic, fluoroantimonic and fluorophosphoric acids; lithium tetrafluoroborate, calcium di-tetrafluoroborate, magnesium di-tetrafluoroborate, lithium hexafluorophosphate, calcium di-hexafluorophosphate, magnesium di-hexafluorophosphate, lithium hexafluoroantimonate and lithium hexafluoroarsenate; lanthanide triflate salts, aryl iodonium salts, aryl sulfonium salts, lanthanum triflate, ytterbium triflate, trimethoxyboroxine, trimethoxyboroxine-aluminum acetyl acetonate, amine-boron trihalide complexes, quaternary ammonium salts, quaternary phosphonium salts, tri-aryl sulfonium salts, di-aryl iodonium salts, and diazonium salts; trialkoxyboroxine curing agents; and combinations thereof.

6. The composition of claim 1, wherein the cationic curable component is selected from an epoxy component, an episulfide component, an oxetane component, a vinyl ether component and combinations thereof.

7. The composition of claim 1, wherein the cationic curable component is an epoxy component selected from the group consisting of cycloaliphatic epoxy, aromatic epoxy, aliphatic epoxy and hydrogenated aromatic epoxy.

8. The composition of claim 7, wherein the epoxy component comprises a member selected from the group consisting of epoxy-functionalized hydrogenated bisphenol-A, bisphenol-F, bisphenol-E, bisphenol-S and biphenyl.

9. The composition of claim 1, wherein the first part is housed in a first chamber of a dual chamber syringe and the second part is housed in a second chamber of the dual chamber syringe.

10. The composition of claim 1, wherein the first part further comprises phosphoric acid.

11. The composition of claim 1, wherein the second part further comprises at least one of a plasticizer, a filler, a thixotrope and a toughener.

12. The composition of claim 11, wherein the toughener is a member selected from the group consisting of (1) (a) reaction products of the combination of ethylene, methyl acrylate and monomers having carboxylic acid cure sites, (2) (b) dipolymers of ethylene and methyl acrylate, (3) combinations of (a) and (b), (4) vinylidene chloride-acrylonitrile copolymers, (5) and vinyl chloride/vinyl acetate copolymer, (6) copolymers of polyethylene and polyvinyl acetate, and combinations thereof.

13. The composition of claim 1, wherein the first part and the second part are present in a ratio of about 1:1 by volume.

14. The composition of claim 1, wherein the first part and the second part are each housed in a separate chamber of a dual chambered container.

15. The composition of claim 1, wherein the hydrophobic groups on a surface of the silica comprise alkyltrialkoxysilane groups.

16. The composition of claim 1, wherein the hydrophobic groups on a surface of the silica comprise alkyltrimethoxysilane groups.

17. The composition of claim 1, wherein the hydrophobic groups on a surface of the silica comprise hexadecyltrimethoxysilane groups.

18. A composition comprising a cyanoacrylate component, a silica having hydrophobic groups that comprise organosilane groups and hydrophilic groups on a surface thereof that comprise silanol groups, and a cationic catalyst.

19. The composition of claim 18, wherein the silica has a BET surface area of 170-210 and a carbon content of 0.9-1.8%.

20. The composition of claim 18, wherein the silica is after-treated with hexadecyl silane.

21. A two-part curable composition comprising:
   (a) a first part comprising a cyanoacrylate component, a silica having hydrophobic groups and hydrophilic groups on a surface thereof, and a cationic catalyst; and
   (b) a second part comprising a cationic curable component,
   wherein when mixed together the cationic catalyst initiates cure of the cationic curable component;

wherein the silica has a BET surface area of 170-210 and a carbon content of 0.9-1.8% and is after-treated with hexadecyl silane; and wherein the cationic catalyst is selected from lithium tetrafluoroborate, calcium di-tetrafluoroborate, magnesium di-tetrafluoroborate, lithium hexafluorophosphate, calcium di-hexafluorophosphate, magnesium di-hexafluorophosphate, lithium hexafluoroantimonate and lithium hexafluoroarsenate.

* * * * *